(12) United States Patent
Schütz

(10) Patent No.: US 8,561,642 B2
(45) Date of Patent: Oct. 22, 2013

(54) CHECK VALVE FOR TRANSPORT AND STORAGE CONTAINERS FOR FLUIDS

(75) Inventor: Udo Schütz, Selters/Westerwald (DE)

(73) Assignee: Protechna S.A., Fribourg (CH)

( * ) Notice: Subject to any disclaimer, the term of this patent is extended or adjusted under 35 U.S.C. 154(b) by 768 days.

(21) Appl. No.: 12/707,720

(22) Filed: Feb. 18, 2010

(65) Prior Publication Data

US 2011/0120575 A1    May 26, 2011

(30) Foreign Application Priority Data

Nov. 24, 2009  (DE) .......................... 10 2009 047 075

(51) Int. Cl.
*F16K 15/00*    (2006.01)
(52) U.S. Cl.
USPC .................. 137/614.2; 137/527.6; 137/527.8; 251/144
(58) Field of Classification Search
USPC ......... 137/614.2, 527, 527.6, 527.8; 251/284, 251/144
See application file for complete search history.

(56) References Cited

U.S. PATENT DOCUMENTS

| | | | |
|---|---|---|---|
| 3,815,629 A * | 6/1974 | Oberholtzer | 137/527.8 |
| 4,422,472 A * | 12/1983 | Klein | 137/614.2 |
| 5,390,814 A | 2/1995 | Christine et al. | |
| 5,551,479 A | 9/1996 | Graves | |
| 6,050,545 A * | 4/2000 | Stolzman | 251/315.05 |
| 6,056,012 A * | 5/2000 | Yuen et al. | 137/614.2 |
| 6,832,693 B2 * | 12/2004 | Schutz | 220/495.01 |
| 7,585,164 B2 * | 9/2009 | Joo et al. | 137/527.8 |

FOREIGN PATENT DOCUMENTS

| | | |
|---|---|---|
| DE | 2551368 A1 | 5/1977 |
| DE | 102004046224 A1 | 4/2006 |
| EP | 1852390 A1 | 11/2007 |
| JP | 56125888 U | 9/1981 |
| JP | 08105556 A | 4/1996 |
| JP | 3044895 U | 1/1998 |
| JP | 11304017 A | 11/1999 |
| JP | 2004292056 A | 10/2004 |
| JP | 2009067389 A | 4/2009 |
| WO | 8903353 A | 4/1989 |
| WO | 2005082739 A1 | 9/2005 |
| WO | 2005119115 A1 | 12/2005 |

OTHER PUBLICATIONS

European Search Report, dated Feb. 16, 2011 for European Application No. EP10190295.5, 2 pages.

* cited by examiner

*Primary Examiner* — Kevin Lee
(74) *Attorney, Agent, or Firm* — Fredrikson & Byron, P.A.

(57) ABSTRACT

A transport and storage container for fluids having a check valve that allows the contents of the storage container to be substantially completely emptied. A valve housing of the check valve has a valve face against which a valve flap rests against in its closed state.

12 Claims, 3 Drawing Sheets

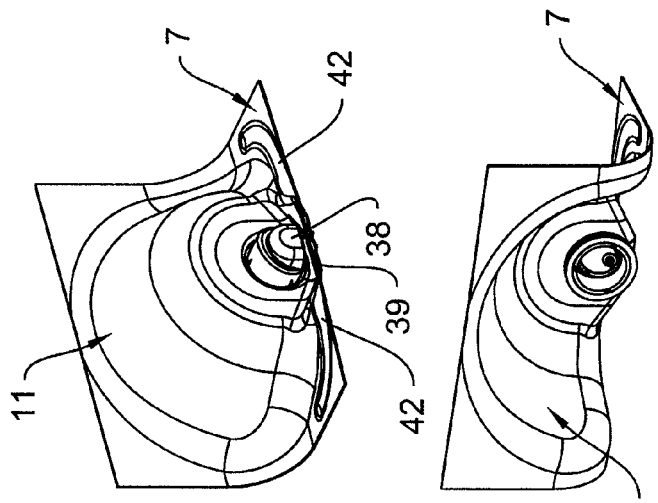
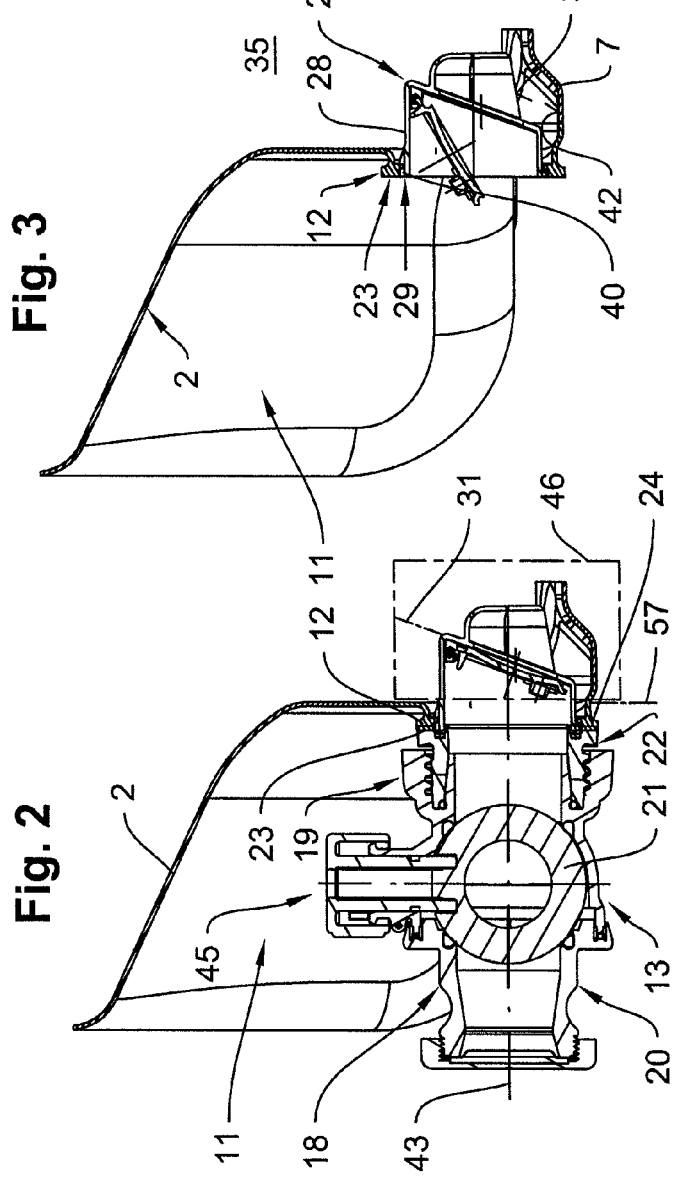
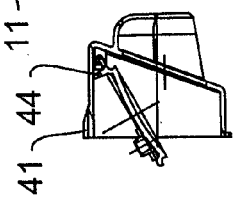
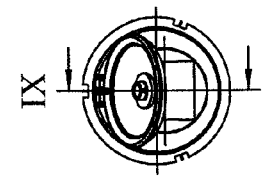
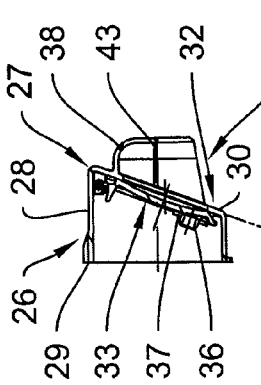
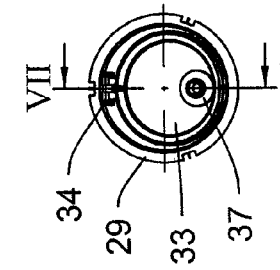

CHECK VALVE FOR TRANSPORT AND STORAGE CONTAINERS FOR FLUIDS

The embodiments of the invention relate to a check valve for transport and storage containers for fluids comprising a closable filler neck and a draining neck for connecting a tapping valve having a closing device, which is in particular embodied as a ball or flap valve, and a coupling flange for connecting the tapping valve to a draining neck of the fluid container, in particular of an inner container made of plastic of the transport and storage container, which is equipped with an outer jacket made of lattice or metal sheet.

Periodically, transport and storage containers of the aforementioned type are used as so-called "circulatory containers", which are accordingly filled repeatedly. So as to provide for the highest possible sales volume of the fluids filled into the containers, it is important to provide for the most complete draining of the containers, so that the entire container volume is available for the new filling for the next filling operation. To some extent, it is also important to attain the most complete draining of the containers, so as not to have to carry out extensive rinsing and cleaning operations, or to at least limit these operations to a corresponding minimum. The filling of circulatory containers with pesticides or similar substances can be cited as an example for this, wherein not only a rinsing and cleaning of the containers is required in such cases, but furthermore additional problems also occur with the disposal of the rinsing fluids, which are contaminated by the pesticides or the like.

The embodiments of the invention are now based on the object of providing for a transport and storage container for fluids, which can substantially be emptied completely.

To solve this object, a check valve comprising the features of claim 1 is proposed.

According to the embodiments of the invention, the check valve encompasses a valve housing, which is provided with a connecting part for connection to a valve housing of the tapping valve and/or to the draining neck of the fluid container and comprising a valve neck, which extends at least from the connecting part through the draining neck into an inflow area of the draining neck, wherein the valve neck encompasses a valve body, which closes against a valve face contrary to the outflow direction and the valve face is arranged in the inflow area or in an area, which is arranged upstream of the inflow area in outflow direction.

Typically, the fluid volume, which can return back into the fluid container after an actuation of the closing device, is determined by the distance of the closing device from the outflow opening of the inner container. In the case of inner containers, which are provided with a draining neck, the outflow opening of the inner container is substantially defined by the inflow cross section of the draining neck. Due to the arrangement of the valve face of the check valve according to the invention in the inflow area of the draining neck or in an area, which is arranged upstream of the inflow area in outflow direction, it is possible to minimize a return volume, which is possible after closing the closing device, independent on the distance of the closing device relative to the outflow opening.

The valve housing can be connected to the tapping valve or the valve housing, respectively, of the tapping valve in one piece or integrally, preferably in such a manner that the connecting part of the valve housing of the check valve is embodied as an integral component of the valve housing of the tapping valve.

However, it is also particularly advantageous when the valve housing of the check valve is embodied as an assembly unit, which is embodied so as to be independent on the tapping valve and so as to be manageable, as it is thus possible to equip a conventional transport and storage container, the inner container of which is provided with a removal fitting, in a simple manner with a check valve.

In the event that the connecting part of the valve housing is embodied as a housing flange, which can be arranged between a coupling flange of the tapping valve and a coupling flange of the draining neck, the check valve can simply be inserted with the housing neck into the draining neck of the inner container prior to the assembly of the tapping valve with a defined relative positioning.

In the event that the connecting part of the valve housing is furthermore embodied as a stop collar for attaching against a stop surface of the draining neck, which is embodied as a bore ledge in a coupling flange of the draining neck in such a manner that the stop collar of the valve housing can be arranged in the coupling flange of the draining neck, a fastening of the housing of the check valve to the draining neck can be carried out simultaneously to the fastening of the tapping valve at the draining neck.

Due to the arrangement of the stop collar of the valve housing in the coupling flange of the draining neck, so as to be flush with the adjacent areas in particular, a welded connection can on principle be made between the stop collar of the valve housing and the draining neck on the other hand and the stop collar of the valve housing and the coupling flange of the tapping valve on the other hand, at the same time as a welded connection of the draining neck with the tapping valve. As a result, the draining neck of the inner container and the coupling flange of the tapping valve as well as the stop collar of the valve housing are thus connected to one another by means of a material connection in a single welding operation.

A particularly fail-safe embodiment of the check valve becomes possible when the valve body is embodied as a valve flap, which is arranged on the side of the valve face facing away from the interior of the container and when its outer edge is supported so as to be pivotable in a pendulum bearing relative to the valve face. It goes without saying that valve bodies, which are embodied in different manners, for example as molds in spherical or cone shape or in other embodiments, are furthermore also possible.

Preferably, the valve face defines a valve plane, which is inclined at an angle to the vertical and the pendulum bearing is arranged above the valve face. In particular the vertically inclined orientation of the valve plane or of the valve face, respectively, in cooperation with the valve flap, which closes contrary to the outflow direction, ensures that in the event of a return of the fluid, which previously drained from the inner container, a gravity-related closing force is added to the dynamic closing force caused by the fluid return, due to the inclined valve plane, so that the gravity component of the valve closing force still provides for a defined closing position of the valve, even in the event of a fluid in the tapping valve, for example.

To prevent a canting or jamming of the valve flap in the valve neck and thus a blocking of the valve flap in opening position in response to a high outflow from the inner container and in response to a valve flap, which is open to an extremely wide extent, it is advantageous when the valve flap is provided with a stop device, which defines the opening angle.

It is particularly advantageous when, for this purpose, the valve flap encompasses at its outer edge and opposite to the pendulum bearing a stop device, which is embodied as a stop rod and which, due to its positioning, must encompass only a comparatively small length as a condition for its efficiency.

To further increase the gravity component of the valve closing force, which has already been explained above, it is advantageous when the valve flap is provided with a connecting device for connecting to a ballast weight.

To prevent the ballast weight, which possibly consists of metal, to be in constant contact with the fluid accommodated in the interior of the container, it is advantageous to arrange the connecting device on the side of the valve flap facing away from the interior of the container.

A reliable function of the check valve—even in case of the smallest residual amount of fluid, which is still present in the interior of the container—becomes possible when the valve neck encompasses an inflow bend, which is inclined with its inflow opening to a bottom sump of the inner container as compared to the outflow direction, on the side of the valve plane facing the interior of the container, because the most holohedral application of pressure of the valve flap from the interior of the container thus becomes possible for completely emptying the container.

Preferred embodiments of the invention will be defined below in more detail by means of the drawing.

DESCRIPTION OF THE DRAWINGS

FIG. 2 shows a sectional view of a first embodiment of a check valve arranged in a draining neck of the inner container of the transport and storage container.

FIG. 3 shows the check valve illustrated in closed position in FIG. 2 in open position.

FIG. 4 shows a perspective view of the check valve viewed from the interior of the container.

FIG. 5 shows a perspective view of the check valve in an exterior view of the inner container.

FIG. 6 shows a view of the check valve in the case of a closed valve flap.

FIG. 7 shows a longitudinal sectional view of the check valve according to the course of intersecting line VII-VII in FIG. 6.

FIG. 8 shows a view of the check valve in the case of an open valve flap.

FIG. 9 shows a sectional view of the check valve illustrated in FIG. 8 according to the course of intersecting line IX-IX.

DETAILED DESCRIPTION

Figure 1:
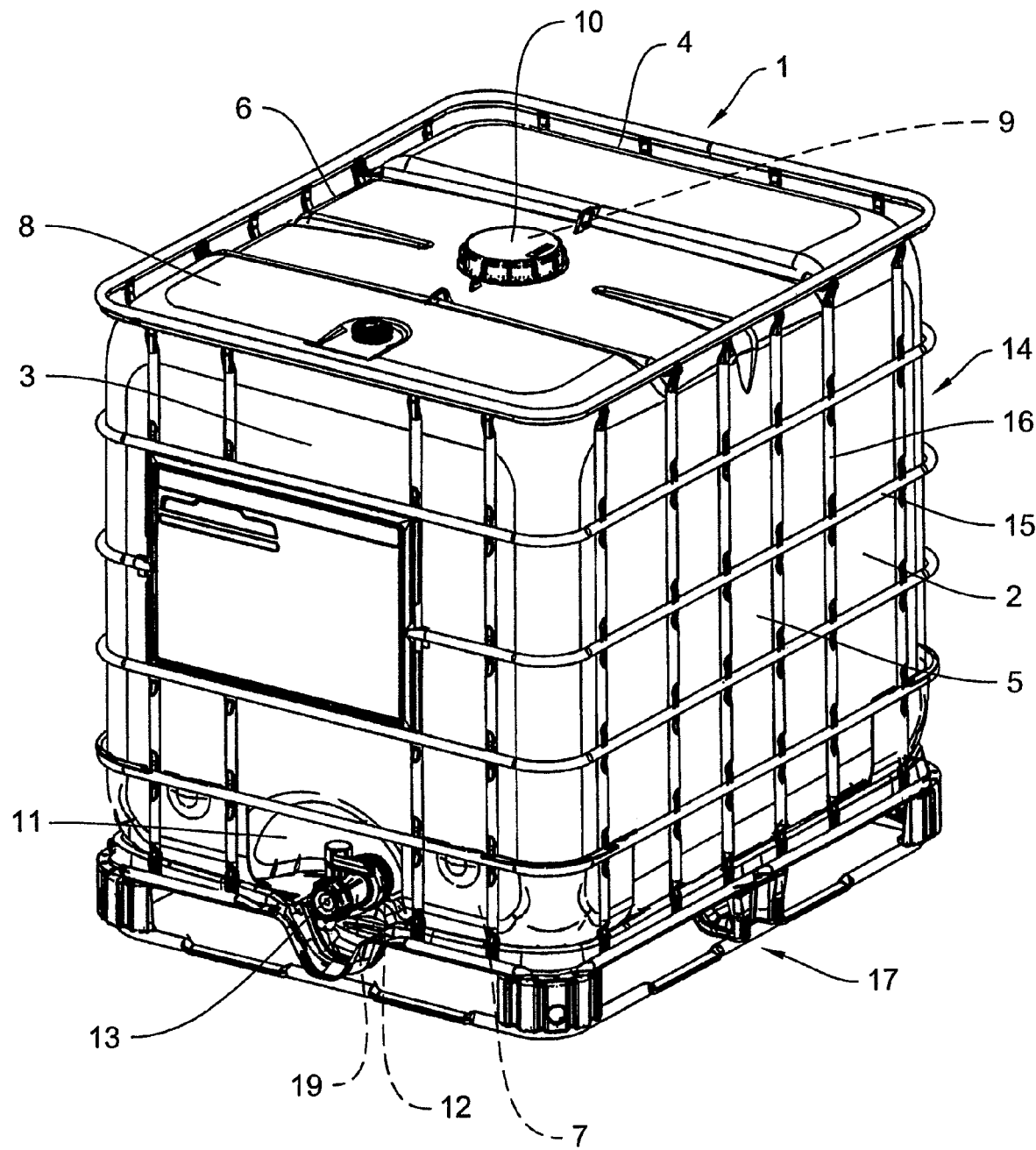
FIG. 1 shows a perspective view of a transport and storage container for fluids.

FIG. 1 shows a transport and storage container 1 for fluids, which can be used as a disposable and reusable container, which encompasses as main components a replaceable rectangular inner container 2 made of plastic, comprising an end wall 3, a rear wall 4 and two side walls 5, 6, a lower bottom 7 embodied as drain bottom and an upper bottom 8, a filler neck 9 molded thereon and being capable of being closed by means of a lid 10 and a draining neck 12, which is molded to a curvature 11 in the lower section of the end wall 3 of the inner container 2 and which is produced in one piece with the inner container 2 by means of blow molding, for attaching a tapping valve 13, in particular of a ball or flap valve, further an outer jacket 14, which is embodied as a grid cover and comprising intersecting horizontal and vertical lattice bars 15, 16 made of metal for accommodating an inner container 2 as well as a pallet-like base frame 17 comprising length and width dimensions for supporting the inner container 2, which correspond to Eurocode.

As is shown in FIG. 2, a valve housing 18, which is injection molded in one piece from a polyethylene of a high density (PE-HD) of the tapping valve 13, which is embodied with a ball valve as closing device 45, has an inflow neck 19 and an outflow neck 20 and is equipped with a closing ball 21.

In the instant case, the valve housing 18 is screwed with the inflow neck 19, which is embodied as a screw nut, onto the coupling flange 22, which is embodied as a threaded flange and which is injection molded from plastic. Said coupling flange 22 is welded to the draining neck 12 of the inner plastic container 2 of the transport and storage container 1 by means of mirror-imaged welding. FIG. 2 shows a weld deposit ring 25, which is arranged between a welding surface of a coupling flange 23 of the draining neck 12 and a welding surface 24 of the coupling flange 22 for carrying out the welding operation.

FIG. 2 further shows a check valve 26, which is accommodated together with the tapping valve 13 or the coupling flange 22 of the tapping valve 13, respectively, and the draining neck 12 of the inner container 2. To explain the design of the check valve 26, reference is initially made below to FIGS. 6 to 9.

FIGS. 6 and 7 show the check valve 26 in closed position, whereas FIGS. 8 and 9 show the check valve in open position. The check valve 26 encompasses a valve housing 27, which encompasses a coupling part, which is embodied as stop collar 29 on the face side of a housing neck 28. A rear housing wall 30, which defines a valve plane 31, is located opposite to the stop collar 29. A valve face 32, which is defined herein by means of a circular faceplate opening and which cooperates with a valve flap 33 arranged in a pendulum bearing 34 above the valve face 32 for the purpose of attaining the valve function, is embodied in the rear housing wall 30. A stop rod 44 arranged at the outer edge of the valve flap 33 prevents a jamming of the open valve flap 33 in the valve neck 28.

In the case of the instant exemplary embodiment, the valve face 32 of the check valve 26 is arranged in an inflow area 46 of the draining neck 12, which results in response to a removal of fluid from the inner container 2, and is located in outflow direction upstream of the outflow opening of the inner container 2, thus upstream of a inflow cross section 57 of the draining neck 12 in this exemplary embodiment.

On its side facing away from the valve face 32 or from an interior of the container 35 (FIG. 3), respectively, the valve flap 33 encompasses a connecting device 36, which serves to connect to a ballast weight 37. In cooperation with the arrangement of the valve plane 31, which is inclined relative to a longitudinal axis 43 of the check valve 26, the ballast weight 37 thus supports the formation of a valve closing force.

As is furthermore shown in FIG. 7, a valve bend 38, which defines an inflow opening 39 arranged at right angles relative to the longitudinal valve axis 43, connects to the rear housing wall 30.

FIG. 3 shows the check valve 26, which is inserted with the valve neck 28 into the draining neck 12, wherein the relative positioning of the check valve 26 in the draining neck 12 or in the inner container 2, respectively, is defined by the stop of the stop collar 29 of the check valve 26 against a stop surface of the draining neck 12, which is formed by means of a bore ledge 40 in the coupling flange 23 of the draining neck 12. As further results from a combined view of FIGS. 3 and 9, a fixing of this relative positioning of the check valve 26 in the draining neck 12 is made possible in that bars 41 embodied in the area of the stop collar 29 of the valve neck 28 cause the valve neck 28 to be fixed in the draining neck 12.

A combined view of FIGS. 3 and 4 makes it clear that an inlet opening 39 of the check valve 26 defined by the valve bend 38 is located in the direct proximity to a bottom sump 42, which is embodied in the lower bottom 7 of the inner container 2 and which forms the lowest point of the container bottom 7.

The particularly simple equipment of the inner container 2 with the check valve 26 becomes clear based on a combined view of FIGS. 2 and 5, which show that the check valve 26 with its stop collar 29 is arranged so as to be flush in the coupling flange 23 of the draining neck 12 after it was inserted into the draining neck 12 of the inner container 2, so that the compound arrangement illustrated in FIG. 2 between the tapping valve 13 or the coupling flange 22 of the tapping valve 13, respectively, the check valve 26 and the draining neck 12 of the inner container 2 becomes possible. The check valve 26 can thus be used at an existing transport and storage container, without having to make changes to the tapping valve 13 or the coupling flange 22, respectively, of the tapping valve 13 or the draining neck 12 of the inner container 2.

Figure 10:
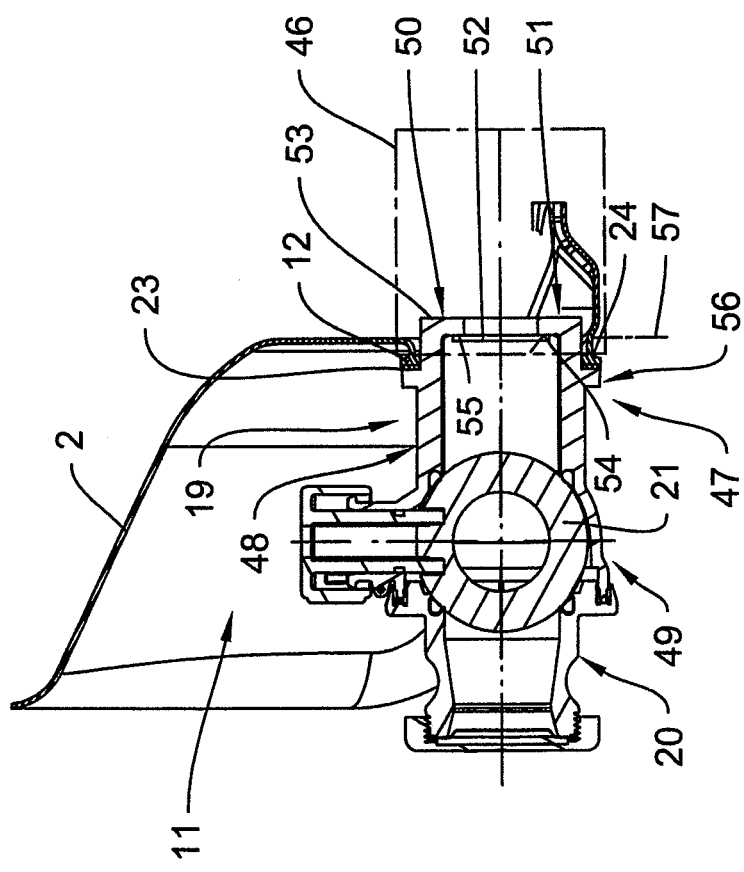
FIG. 10 shows a second embodiment of a check valve comprising a valve housing, which is integrated into the tapping valve.

In a further exemplary embodiment, FIG. 10 shows a check valve 47, the valve housing 51 of which encompasses a connecting part, which is embodied in one piece as a ring flange 56 on a valve housing 48 of a tapping valve 49 and which, in the case of the instant exemplary embodiment, at the same time forms the coupling flange for connecting the tapping valve 49 to the draining neck 12. Apart from the valve housing 48, the tapping valve 49 encompasses components, which correspond to the tapping valve 13 illustrated in FIG. 2 and reference numerals, which correspond thereto.

The check valve 47 encompasses a valve housing 51, which is embodied by a feed neck 50 of the valve body 48, comprising a valve body, which is embodied herein as a valve flap 52 and which is accommodated in a valve face 54 embodied in a rear housing wall 53 of the valve housing 51 in the closed position of the check valve 47 illustrated in FIG. 10. In the case of the instant exemplary embodiment, the valve face 54 is located in the area of the inflow cross section 57 of the draining neck 12. The valve flap 52 is connected to the rear housing wall via a hinged joint for the purpose of embodying a pendulum bearing 55. The hinged joint can be embodied directly in the valve flap 52, which is preferably self-sealing, or also in a seal, which is connected to the valve flap 52.

The invention claimed is:

1. A transport and storage container for fluids comprising a closable filler neck and a draining neck for connecting a tapping valve thereto, the tapping valve having a closing device and a coupling flange for connecting the tapping valve to the draining neck of the fluid container, the transport and storage container
    comprising
    a check valve having a valve housing that can be inserted into the draining neck of the fluid container, the valve housing includes a stop collar that abuts a portion of the draining neck to couple the valve housing to the fluid container so that a remainder of the valve housing extends into an inflow area of the draining neck, the valve housing, including a valve located in the inflow area of the fluid container when the valve housing is inserted into the draining neck, wherein the valve located in the valve housing closes contrary to an outflow direction of fluid from the fluid container.

2. The transport and storage container according to claim 1, wherein the valve housing of the check valve is an integral component of the tapping valve.

3. The transport and storage container according to claim 1, wherein the valve housing of the check valve is embodied as an assembly unit, which can be handled independent of the tapping valve.

4. The transport and storage container according to claim 3, wherein the stop collar of the valve housing abuts a stop surface of the draining neck of the fluid container.

5. The transport and storage container according to claim 4, wherein the stop surface of the draining neck, is a bore ledge.

6. The transport and storage container according to claim 1, wherein a valve plane is defined in the valve housing and the valve is embodied as a valve flap that is arranged on a side of the valve plane facing away from the interior of the container, wherein the valve flap is pivotably coupled to the valve housing at an outer edge of the valve flap.

7. The transport and storage container according to claim 6, wherein the valve plane is at an angle to a vertical and the valve flap is pivotably coupled to the valve housing at an upper most part of the valve flap.

8. The transport and storage container according to claim 6 or 7,
    wherein the valve flap is provided with a stop device, which defines an opening angle.

9. The transport and storage container according to claim 7, wherein the valve flap encompasses at its outer edge and near the uppermost part of the valve flap is a stop device, which is embodied as a stop rod.

10. The transport and storage container according to claim 6,
    wherein the valve flap is provided with a connecting device at a position opposite to the uppermost part of the valve flap for connecting to a ballast weight.

11. The transport and storage container according to claim 10,
    wherein the connecting device is arranged on the side of the valve flap, which faces away from the interior of the container.

12. The transport and storage container according to claim 1,
    wherein the valve housing includes a valve bend on the side of the valve plane facing toward the interior of the container.

* * * * *